United States Patent
Rhodes et al.

(10) Patent No.: US 6,509,732 B1
(45) Date of Patent: Jan. 21, 2003

(54) ENHANCED METHODS FOR SENSING POSITIONS OF AN ACTUATOR MOVING LONGITUDINALLY

(75) Inventors: Michael L. Rhodes, Richfield, MN (US); Howard B. French, Falcon Heights, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/561,671

(22) Filed: May 1, 2000

(51) Int. Cl.[7] .................. G01R 33/025; G01B 7/14; G01B 7/30
(52) U.S. Cl. .............. 324/207.12; 324/207.24
(58) Field of Search ............... 324/207.12, 207.15, 324/207.16, 207.17, 207.2, 207.21, 207.22, 207.24, 207.25, 251, 252; 338/32 R, 32 H (56) References Cited

U.S. PATENT DOCUMENTS

| | | | | |
|---|---|---|---|---|
| 4,223,228 A | * | 9/1980 | Kaplan | 378/205 |
| 5,589,769 A | * | 12/1996 | Krahn | 324/207.26 |
| 5,886,519 A | | 3/1999 | Masreliez et al. | 324/207.17 |

FOREIGN PATENT DOCUMENTS

| | | |
|---|---|---|
| EP | 0503384 A | 9/1992 |
| GB | 2349047 A | 10/2000 |
| WO | 9961868 A | 12/1999 |

* cited by examiner

*Primary Examiner*—Edward Lefkowitz
*Assistant Examiner*—Reena Aurora
(74) *Attorney, Agent, or Firm*—Kris T. Fredrick (57) ABSTRACT

Systems and methods are discussed that detect the position of an actuator. One aspect of the present invention includes a system to detect a position of an actuator. The system includes a magnetic source coupled to the actuator radiating a field, at least two sensors to generate a response based on angles of the field, and an analyzer receptive to the response to produce an enhanced position of the magnetic source. Such analysis occurs in the presence of undesired effects arising from misalignment of the at least two sensors. Another aspect of the present invention includes a method for detecting a position of an actuator. The method includes interpolating a response of at least two sensors to form a quantity. The quantity is indicative of a position of a magnetic source coupled to the actuator. The method further includes adjusting the quantity by selecting one of two compensation techniques. One compensation technique is based on maximum slopes of the response curve. Another compensation technique is based on minimum separation of a cubic fit of the response curve.

20 Claims, 5 Drawing Sheets

ENHANCED METHODS FOR SENSING POSITIONS OF AN ACTUATOR MOVING LONGITUDINALLY

RELATED APPLICATIONS

This application is related to another application with U.S. Ser. No. 09/059,798 filed Apr. 14, 1998, entitled "Position Detection Apparatus and Method of Compensation Nonlinear Sensor Regions, which issued Aug. 1, 2000, as U.S. Pat. No. 6,097,183.

TECHNICAL FIELD

This invention relates generally to detecting positions of actuators, and more particularly to sensing magnetic field angles that are indicative of the positions of actuators.

BACKGROUND

An actuator is a mechanical device for moving or controlling another device. An actuator may be used to control a valve such that the flow of liquid, gas, or lose material in bulk may be started, stopped, or regulated by opening, shutting, or partially obstructing one or more passageways. The status of the valve (open, shut, or partially obstructing) can be inferred from the position of the actuator.

One technique to determine the position of the actuator includes the use of an electromagnetic source. This electromagnetic source can be coupled to a side of the actuator. As the actuator moves longitudinally to control a valve, the electromagnetic source radiates an electromagnetic field. A set of sensors can be placed in an opposing position with respect to the electromagnetic source. A subset of the sensors may sense the electromagnetic field. Because the position of the set of sensors is predetermined, the position of the actuator can be calculated from the position of the subset of the sensors that senses the electromagnetic field.

The process of manufacturing the set of sensors is not always ideal. As a result, these sensors may be misaligned. Such a misalignment creates undesired effects in the sensing of the electromagnetic field. Undesired effects impact the calculation of the position of the actuator so that the calculated position may be imprecise. Imprecision in the calculated position of the actuator renders imprecision in the inferred status of the valve. In certain circumstances, such as the cooling of a nuclear generator or in food processing, such imprecision may lead to catastrophic results.

Thus, what is needed are systems and methods to enhance detection of the positions of actuators.

SUMMARY

Systems and methods for detecting the position of an actuator are discussed. An illustrative aspect includes a system to detect a position of an actuator. The system includes a magnetic source coupled to the actuator radiating a field, at least two sensors to generate a response based on angles of the field, and an analyzer receptive to the response to produce an enhanced position of the magnetic source in the presence of undesired effects arising from misalignment of the at least two sensors.

Another illustrative aspect includes a method for detecting a position of an actuator. The method includes interpolating a response of at least two sensors to form a quantity that is indicative of a position of a magnetic source coupled to the actuator. The method further includes adjusting the quantity by selecting one of two compensation techniques. Each compensation technique includes forming at least one adjustment. The act of forming the at least one adjustment includes forming an amplitude component. The act of selecting includes selecting a compensation technique based on correlating a plurality of maximum slopes of the response to a plurality of amplitude components between the magnetic source and the at least two sensors. The act of selecting includes selecting a compensation technique based on correlating a plurality of minimum separations of the response to a plurality of amplitude components between the magnetic source and the at least two sensors. A minimum separation is defined to be a minimum of a plurality of separations. Each separation is defined to be a certain distance between a maximum and a minimum of a cubic fit to the response.

DETAILED DESCRIPTION

In the following detailed description of exemplary embodiments of the invention, reference is made to the accompanying drawings that form a part hereof, and in which is shown, by way of illustration, specific exemplary embodiments in which the invention may be practiced. In the drawings, like numerals describe substantially similar components throughout the several views. These embodiments are described in sufficient detail to enable those skilled in the art to practice the invention. Other embodiments may be utilized and structural, logical, electrical, and other changes may be made without departing from the spirit or scope of the present invention. The following detailed description is, therefore, not to be taken in a limiting sense, and the scope of the present invention is defined only by the appended claims.

Figure 1:
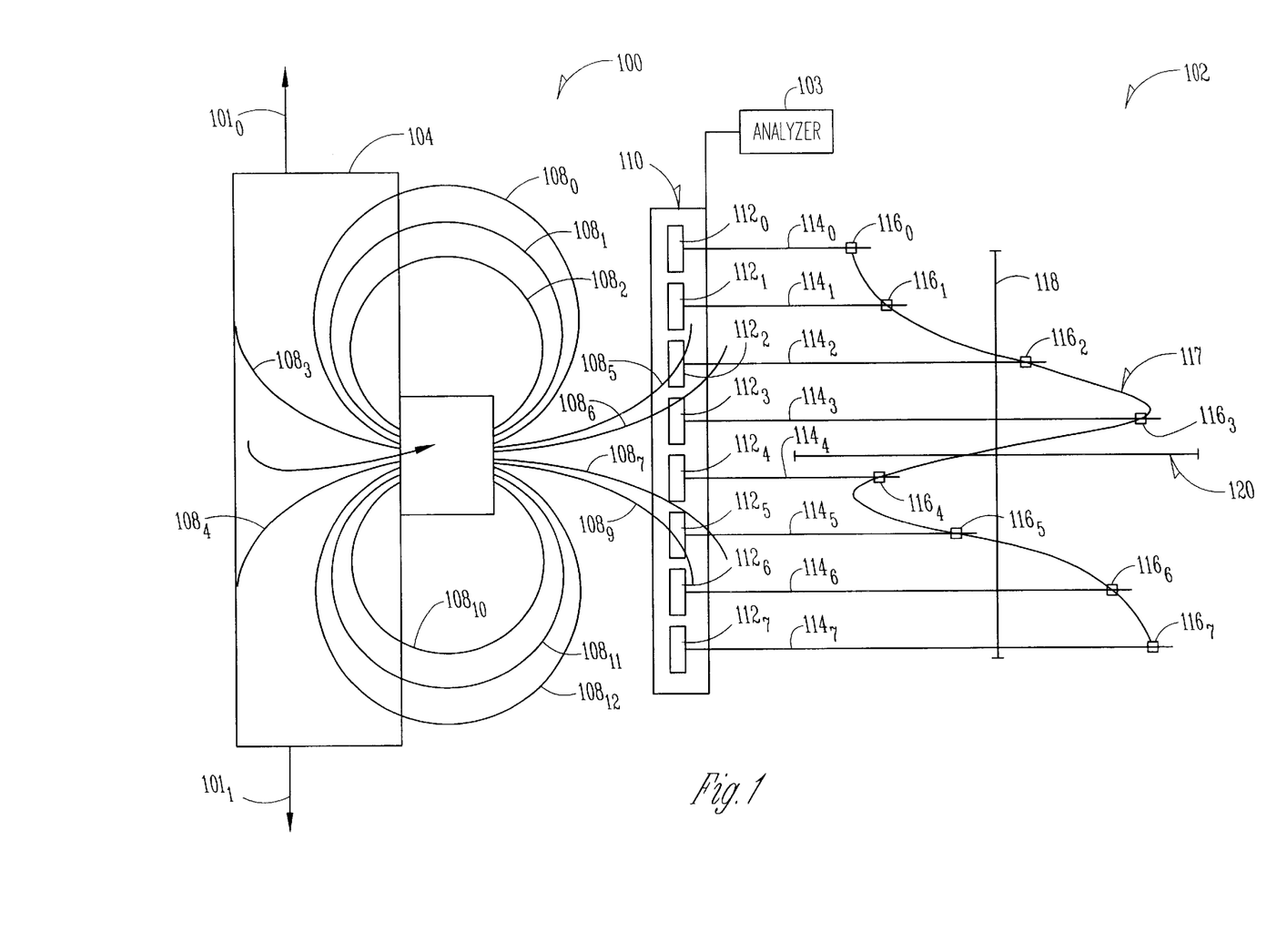
FIG. 1 overlays a system diagram and a graph according to one aspect of the present invention.

FIG. 1 overlays a system diagram and a graph according to one aspect of the present invention. A system 100 is overlaid with a graph 102 for clarity purposes. The system 100 includes an actuator 104. The actuator 104 may move longitudinally in the directions as shown by arrows $101_0$ and $101_1$ to control another device, such as a valve. The system 100 includes a magnetic source 106. The magnetic source 106 is coupled to the actuator 104. The magnetic source 106 radiates a field, which is illustrated by a plurality of field lines $108_0$, $108_1$, $108_2$, $108_3$, $108_4$, $108_5$, $108_6$, $108_7$, $108_9$, $108_{10}$, $108_{11}$ and $108_{12}$. The plurality of field lines may be detected by a set of sensors 110. The set of sensors 110 is opposingly positioned with respect to the magnetic source 106. The set of sensors 110 includes the eight sensors $112_0$, $112_1$, $112_2$, $112_3$, $112_4$, $112_5$, $112_6$, and $112_7$. In one embodiment, at least two sensors are used. In another embodiment, at least three sensors are used. In yet another embodiment, at least four sensors are used.

The set of sensors 110 operates to detect an angle of an incident field line from the plurality of field lines. The position of the set of sensors 110 is predetermined. When the actuator 104 moves to a new position, the magnetic source 106 moves with the actuator 104. The magnetic source 106 radiates at the new position and a subset of the set of sensors 110 will generate a response from sensing the radiated field lines at the new location.

A graph 102 illustrates a response of a subset of the set of sensors 110. The graph 102 includes a plurality of lines $114_0$, $114_1$, $114_2$, $114_3$, $114_5$, $114_6$, and $114_7$ to visually couple the graph 102 to the system 100. This plurality of lines serves to visually suggest that data points $116_0$, $116_1$, $116_2$, $116_3$, $116_4$, $116_5$, $116_6$, and $116_7$ are generated by the subset of the set of sensors 110. These data points form a response 117 of the set of sensors 110. This response is graphed on to an ordinate axis 118, which is indicative of positions, and an abscissa axis 120, which is indicative of values of the response, such as voltage.

One technique to approximate a position of the magnetic source 106 includes interpolating two data points to form the position of the magnetic source 106. A sinusoidal term may be used to adjust the position to compensate for certain errors. The embodiments of the present invention further enhance such a technique by adjusting the position with additional adjustments to gain more precision.

In certain circumstances, the manufacturing of the set of sensors 110 may lead to a misalignment of at least one sensor of the set of sensors 110. Such a misalignment introduces undesired effects that cause error in the computation of the response 117. The embodiments of the present invention provide an analyzer 103 that is receptive to the response 117 to produce an enhanced position of the magnetic source 106 notwithstanding the presence of undesired effects arising from misalignment of at least one sensor of the set of sensors 110. In one embodiment, the enhanced position is a sum of a quantity and three adjustments. Each of the three adjustments is sinusoidal.

What has been discussed hereinbefore is that the adjustments afforded by the various embodiments of the present invention not only increase the precision of the calculated position of the magnetic source 107 but also compensate for undesired effects arising from misalignment of sensors. Such adjustments are discussed further hereinafter.

FIGS. 2A, 2B, 2C, and 2D show an elevation view, a closed-up view, another elevation view, and a side view, respectively, of a system according to one aspect of the present invention. These Figures include elements similar to elements discussed hereinbefore. Such a discussion is incorporated here in full. For clarity purposes, certain numerical references are removed in subsequent Figures so as to focus on portions of interest.

Figure 2A:
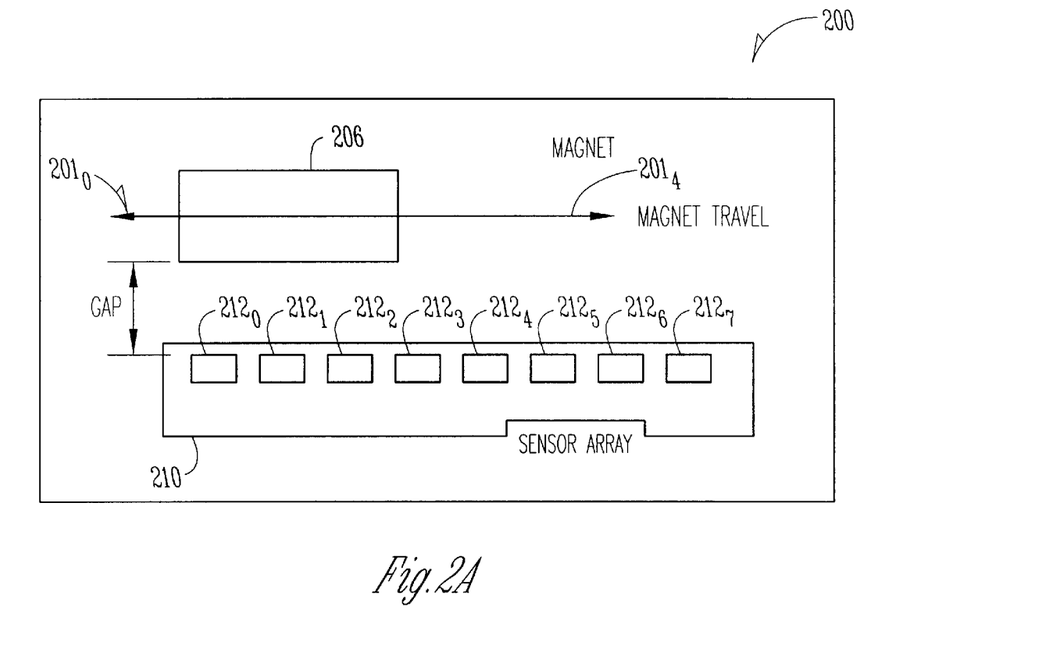
FIGS. 2A, 2B, 2C, and 2D show an elevation view, a closed-up view, another elevation view, and a side view, respectively, of a system according to one aspect of the present invention.

FIG. 2A is an elevation view of a system according to one aspect of the present invention. A system 200 includes a magnet 206 mounted on an actuator (not shown). The magnet 206 moves longitudinally along the directions as indicated by arrows $201_0$ and $201_1$. A set of sensors 210 senses the field radiated by the magnet 206. The set of sensors 210 includes sensors $212_0$, $212_1$, $212_2$, $212_3$, $212_4$, $212_5$, $212_6$, and $212_7$. At least one sensor of the set of sensors 210 is misaligned. Without at least one embodiment of the present invention, such a misalignment introduces error into the calculation of the position of the magnet 206. Because the system 200 benefits from at least one embodiment of the present invention, the calculation of the position of the magnet 206 is enhanced to compensate for the error arising from the misalignment.

Figure 2B:
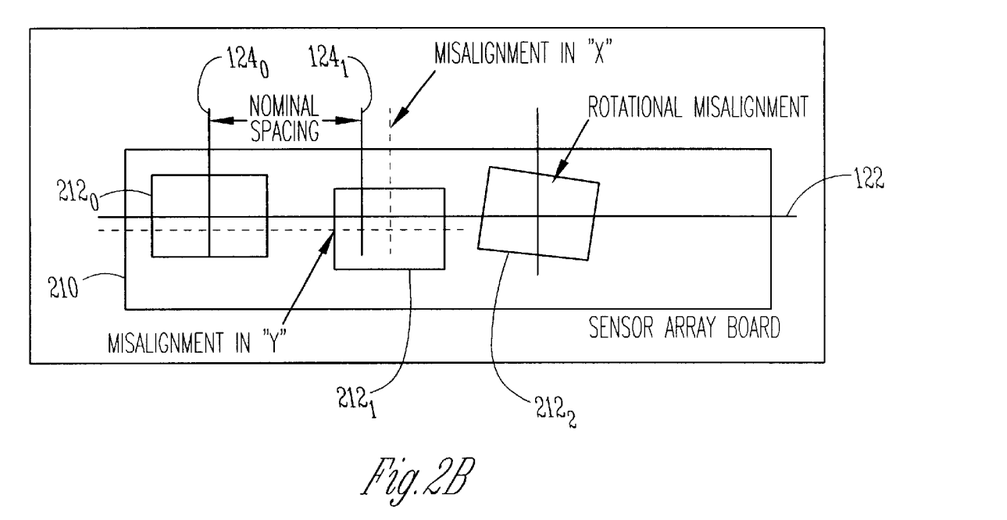

FIG. 2B is a closed-up view of the set of sensors 210 according to one aspect of the present invention. FIG. 2B illustrates various types of misalignment that may occur in manufacturing the set of sensors 210. The set of sensors 210 includes a sensor $212_0$. The sensor $212_0$ is not misaligned since it sits in the desired nominal horizontal position $124_0$ and the desired nominal vertical position 122. The set of sensors 210 includes a sensor $212_1$. The sensor $212_1$ is misaligned in both the desired nominal horizontal position $124_1$ and the desired nominal vertical position 122. The set of sensors 210 includes a sensor $212_2$. The sensor $212_2$ is misaligned rotationally. The embodiments of the present invention compensate for errors arising from the types of misalignment as illustrated in FIG. 2B.

Figure 2C:
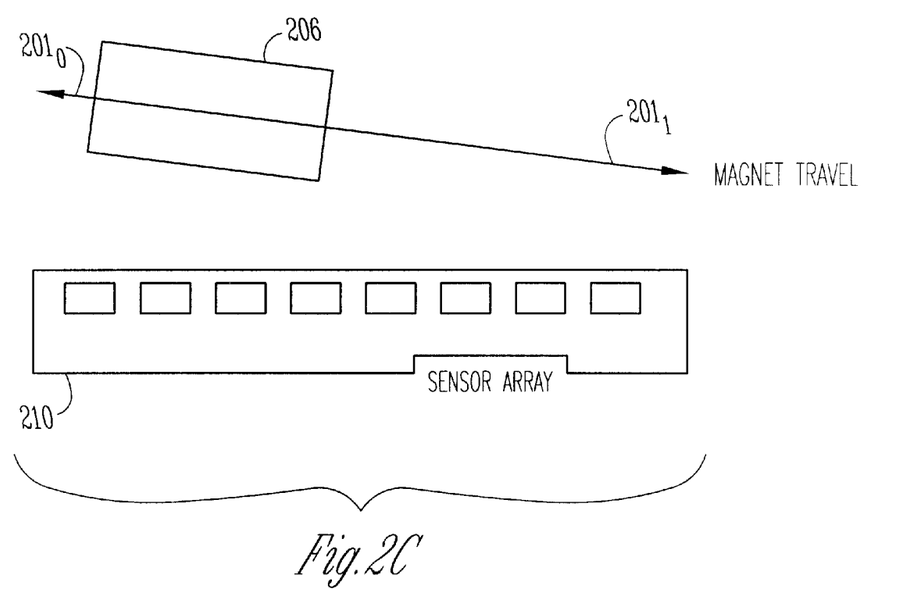

FIG. 2C is an elevation view according to one aspect of the present invention. FIG. 2C illustrates run-out misalignment that introduces errors into the calculation of the magnet 206. The magnet 206 travels in the directions as shown by lines $201_0$ and $201_1$ such that the gap between the magnet 206 and the set of sensors 210 is non-equidistant from position to position. The embodiments of the present invention compensate for errors arising from run-out as illustrated in FIG. 2C.

Figure 2D:
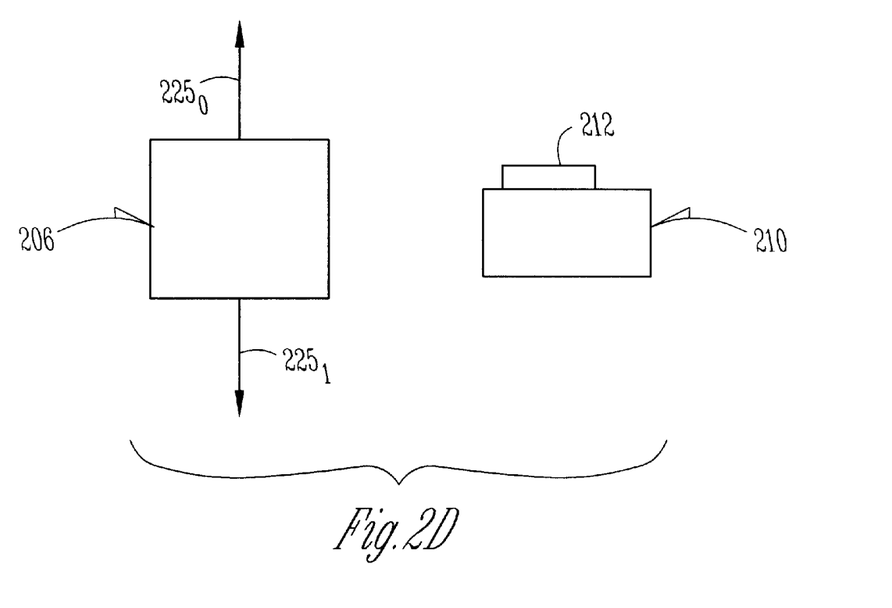

FIG. 2D is a side view of a system according to one aspect of the present invention. FIG. 2D illustrates skew misalignment that introduces errors into the calculation of the magnet 206. The magnet 206 travels in the directions as shown by lines $225_0$ and $225_1$. The desired directions are longitudinal with respect to the set of sensors 210 that includes sensor 212 (in and out of the page). The embodiments of the present invention compensate for errors arising from skew as illustrated in FIG. 2D.

Figure 3A:
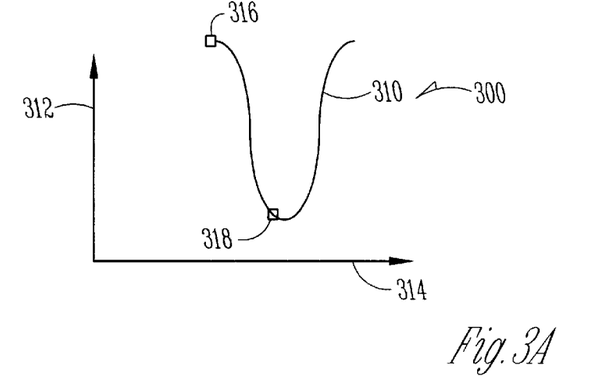
FIGS. 3A, 3B, 3C, 3D, and 3E show graphs according to one aspect of the present invention.

FIGS. 3A, 3B, 3C, 3D, and 3E show graphs according to one aspect of the present invention. FIG. 3A illustrates a graph 300 of a response curve 310 of sensors sensing the angle of the magnetic field. The response curve 310 is derived from a plurality of data points generated by sensors. The response curve 310 is graphed over an ordinate axis 312, which represents the values of the response, and an abscissa axis 314, which represents the positions of sensors.

To calculate the position of the magnetic source, values of at least two sensors are interpolated, such as value 316 and value 318 of the response curve 310. Because of undesired effects, the calculated position may contain errors. Thus, the calculated position may not accurately represent the actual position of the magnetic source. The embodiments of the present invention compensate for the undesired effects so that the calculated position substantially represents the actual position of the magnetic source.

Figure 3B:
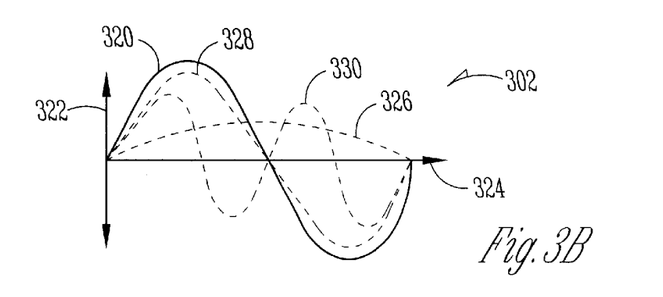

FIG. 3B illustrates a graph 302 of an error curve 320 that characterizes the undesired effects arising from various manufacturing defects, such as misalignment of sensors, undesired gap distances, run-out, and skew. The error curve 320 is graphed over an ordinate axis 322, which represents the magnitudes of the error, and an abscissa axis 324, which represents fractional values of the calculated position. Therefore, in the embodiment that the error curve 320 is sinusoidal-like, the calculated position defines the period of the error curve 320.

The embodiments of the present invention approximate the error curve 320 using a sine curve 328 that has the same period as the error curve 320. Because the sine curve 328 may not approximate the error curve to a desired degree of precision, the embodiments of the present invention further approximate the error curve 320 by adding a sine curve 326, which has half of the period of the error curve 320. Additionally, the embodiments of the present invention further approximate the error curve 320 by a sine curve 330, which has twice the period of the error curve 320. Each sine curve of sine curves 326, 328, and 330 has a magnitude. The calculation of the magnitudes for sine curves 326, 328, and 330 will be discussed hereinafter.

Mathematically, the approximation of the error curve 320 using the three sine curves 326, 328, and 330 can be described as $\alpha=\beta+A \sin(\frac{1}{2}\beta\cdot 2\pi)+B \sin(\beta\cdot 2\pi)+C \sin(2\beta\cdot 2\pi)$. $\alpha$ represents the enhanced position. $\beta$ represents a quantity with a value between 0 and 1; such a quantity represents a normalized interpolation between two data points on a response curve 310. A, B, and C represent magnitudes of the three sinusoidal terms.

During manufacturing, the magnitudes A, B, and C for sine curves 326, 328, and 330 can be empirically derived for a certain gap between the magnetic source and the sensors from various calibration procedures at the factory. This is possible because the true gap can be readily observed. The gap between the magnetic source and the sensors as installed in the field may be different from the gap during the various calibration procedures at the factory. Such a difference may render the factory-derived magnitudes A, B, and C insufficient to approximate the error curve 320. Because the true gap of the magnetic source may not be known in the field, another technique to derive the magnitudes A, B, and C is used.

Figure 3C:
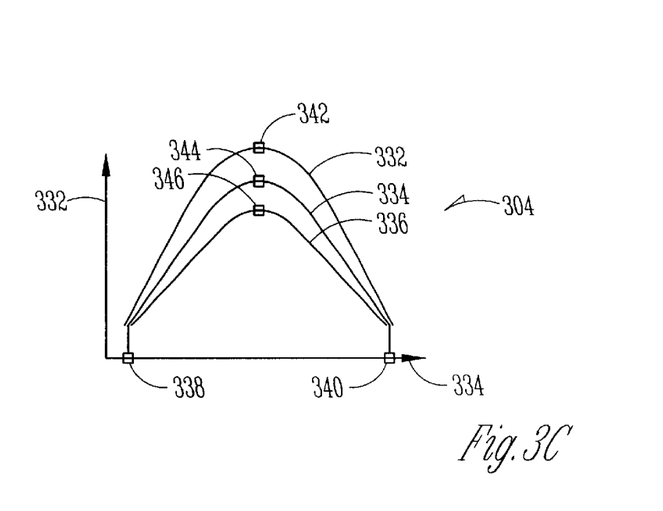

FIG. 3C illustrates a graph 304 that represent a relationship between slopes of the response curve 310 and positions of the magnetic source between two sensors. These two sensors include a sensor positioned at 338 and another sensor positioned at 340. The graph 304 includes the abscissa axis 334 that represents positions of a magnetic source. The ordinate axis 332 represents slopes of the response curve 310.

The graph 304 includes a curve 334. The curve 334 represents the slopes of the response curve 310 measured between the two sensors at a first predetermined gap between the magnetic source and the two sensors. The curve 334 includes a maximum 344. The graph 304 includes a curve 336 that represents the slopes of the response curve 310 measured between the two sensors at a second predetermined gap between the magnetic source and the two sensors. The curve 336 includes a maximum 346. Therefore, one observation that can be drawn from the curves 334 and 336 is that there is a correlation between the gap and the maximum slope of the response curve 310. As discussed hereinbefore, the true gap of the magnetic source may not be known in the field. Therefore, the maximum slope of the response curve 310, which can be readily measured in the field, may be used to derive the magnitudes A, B, and C.

The graph 304 includes a curve 332. The curve 332 represents slopes of the response curve 310 measured between the two sensors at the second predetermined gap. The response curve 310 was measured in the presence of undesired effects. These undesired effects arise from misalignment of at least one of sensor, run-out, or skew. One observation that can be drawn from the curves 332, 334, and 336 is that there is a correlation between the undesired effects and the maximum slope of the response curve 310. Therefore, the maximum slope of the response curve 310, which can be readily calculated in the field, may be used to derive the magnitudes A, B, and C to compensate for the undesired effects.

What has been discussed hereinbefore is that the maximum slope of the response curve 310 may be used to characterize several pieces of information. First, the maximum slope can be used to characterize the variations in the gap between a magnetic source and a set of sensors. Second, the maximum slope can be used to characterize the undesired effects arising from misalignment, run-out, or skew. Because the maximum slope can be readily measured in the field, the maximum slope can be used to determine the magnitudes A, B, and C. Recall that these magnitudes are used in at least three sinusoidal terms to adjust an initial estimate of the position of the magnetic source.

Figure 3D:
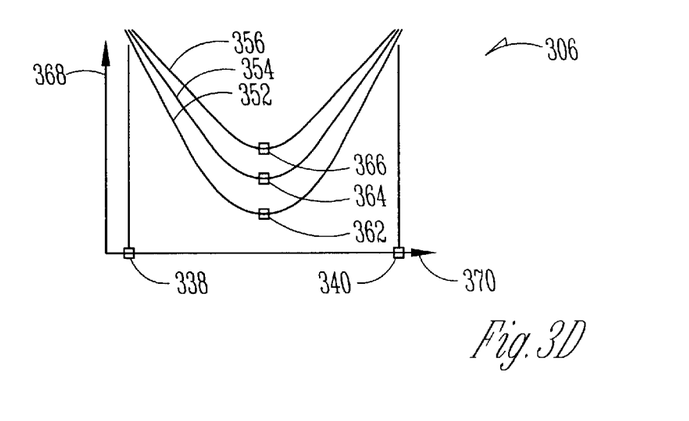

FIG. 3D illustrates a graph 306 that represents a relationship between a cubic fit of the response curve 310 and positions of the magnetic source between two sensors. These two sensors include a sensor positioned at 338 and another sensor positioned at 340. The graph 306 includes the abscissa axis 368 that represents positions of a magnetic source. The ordinate axis 370 represents distances of a maximum and a minimum of a cubic fit of the response curve 310.

The graph 306 includes three curves 352, 354, and 356. These curves are derived from the following process: taking a cubic fit of the response curve 310, determining a maximum of the cubic fit, determining a minimum of the cubic fit, and determining the distances between the maximum and the minimum. Each data point of curves 352, 354, and 356 is derived from the distance between the maximum and the minimum. Hereinafter, this distance is defined as the "separation."

The graph 306 includes a curve 354. The curve 354 was derived from the first predetermined gap between the magnetic source and the set of sensors. The curve 354 includes a minimum separation 364. The graph 304 includes a curve 356 that was derived from the second predetermined gap. The curve 356 includes a minimum separation 366. Therefore, one observation that can be drawn from the curves 354 and 356 is that there is a correlation between the gap and the minimum separation of the response curve 310. As discussed hereinbefore, the true gap of the magnetic source may not be known in the field. Therefore, the minimum separation of the response curve 310, which can be readily measured in the field, may be used to derive the magnitudes A, B, and C.

The graph 304 includes a curve 352. The curve 352 includes a minimum separation 362. The response curve 310 was measured in the presence of undesired effects. These undesired effects arise from misalignment of at least one sensor, run-out, or skew. One observation that can be drawn from the curves 352, 354, and 356 is that there is a correlation between the undesired effects and the minimum separation of the response curve 310. Therefore, the minimum separation of the response curve 310, which can be readily measured in the field, may be used to derive the magnitudes A, B, and C to compensate for the undesired effects.

What has been discussed hereinbefore is that the minimum separation of the response curve 310 is another technique that may be used to characterize pieces of information that were discussed relating to the maximum slope. Such a discussion is incorporated here in full.

Figure 3E:
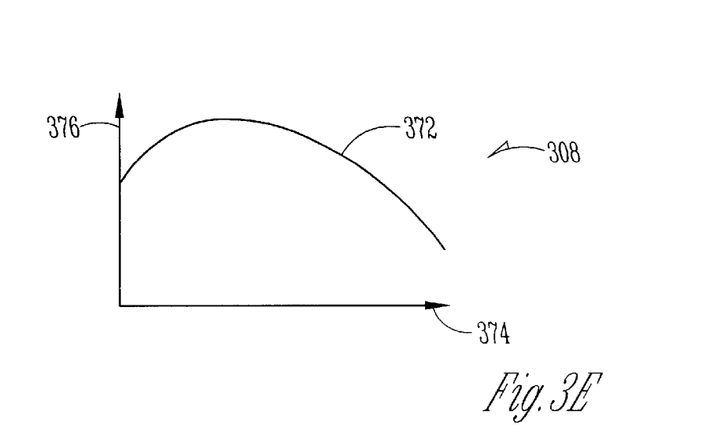

FIG. 3E illustrates a graph 308 that represents a relationship between values of a magnitude (A, B, or C) versus maximum slopes of the response curve. The ordinate axis 376 represents the values of a magnitude. The abscissa axis 374 represents the maximum slopes of the response curve. The graph 308 includes a curve 372. Thus, if a maximum slope is known, a corresponding magnitude can be calculated using the curve 372.

In one embodiment, the curve 372 is predetermined at a factory for a plurality of gaps for at least two sensors. In the field, the maximum slope can be measured and can be fitted onto this curve using a suitable technique, such as a parabolic fitting technique. The foregoing discussion is related to maximum slopes, but such a discussion is equally applicable to minimum separations with appropriate changes.

Figure 4:
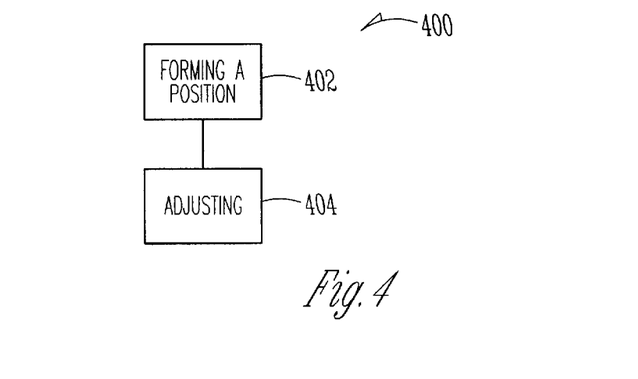
FIG. 4 shows a process diagram for a method according to one aspect of the present invention.

FIG. 4 shows a process diagram for a method according to one aspect of the present invention. A process 400 is a method for detecting a position of an actuator. The process 400 includes an act 402 for forming a position of a magnetic source coupled to the actuator. The act for forming 402 includes forming a quantity that is indicative of the position of the magnetic source. The quantity is formed from a response of at least two sensors based on angles of the field radiated form the magnetic source. The act of forming a quantity includes interpolating two data points of the response. In one embodiment, the quantity is a normalized quantity with a value between 0 and 1.

The process 400 further includes an act 404 for adjusting the position of the magnetic source using a set of adjustments. Each adjustment includes an amplitude component and a sinusoidal component. In one embodiment, the period of the sinusoidal component is related to the quantity. In another embodiment, the period is related to a number selected from a group consisting of halving the quantity, the quantity, and doubling the quantity. The act for adjusting 404 includes summing the quantity with each adjustment of the set of adjustments.

In one embodiment, the set of adjustments includes three adjustments. The act for adjusting 404 includes adjusting each amplitude component of the three adjustments. The act of adjusting each amplitude component includes fitting a maximum slope to a predetermined curve. The predetermined curve defines a range of maximum slopes to a range of magnitudes of an amplitude component. The predetermined curve is defined for a plurality of predetermined gaps between the magnetic source and at least one sensor.

In another embodiment, the process 400 may include a method for enhancing a calculated position of a magnet. The process 400 includes calculating the calculated position, forming an error function of the calculated position, and adjusting the calculated position to produce an enhanced calculated position. Such an enhanced calculated position is substantially a true position. Such adjustment occurs in the presence of undesired effects arising from misalignment of sensors for sensing the magnet. The act of calculating includes forming an interpolation from a response of the sensors. The act of forming includes decomposing the error function into a sum of at least three compensating functions. The act of decomposing includes determining a magnitude of each compensating function of the at least three compensating functions as a function of a gap between the magnet and the sensors. The act of determining includes determining the function of the gap that is related to a maximum slope of the response. The magnitude of each compensating function is adapted to fit to a plurality of predetermined magnitudes of each compensation function for a plurality of predetermined maximum slopes.

In another embodiment, the process 400 includes interpolating a response of at least two sensors to form a quantity that is indicative of a position of a magnetic source coupled to the actuator. The process 400 further includes adjusting the quantity by selecting one of two compensation techniques. Each compensation technique includes forming at least one adjustment. The at least one adjustment includes an amplitude component.

The act of selecting includes selecting a compensation technique based on correlating a plurality of maximum slopes of the response to a plurality of amplitude components for a plurality of predetermined gaps between the magnetic source and the at least two sensors. The act of selecting includes selecting a compensation technique based on correlating a plurality of minimum separations of the response to a plurality of amplitude components for a plurality of predetermined gaps between the magnetic source and the at least two sensors. The minimum separation is defined to be a minimum of a plurality of separations. Each separation is defined to be a distance between a maximum and a minimum of a cubic fit to the response.

CONCLUSION

Systems and methods have been discussed to detect the position of an actuator. Various embodiments of the present invention compensate for undesired effects that may arise from undesired gap distances, misalignment of sensors, runout, and skew. Various embodiments of the present invention abstract the undesired effects by using techniques that can be used in the field, such as maximum slopes or minimum separations of responses of sensors. Although various embodiments of the present invention use one, two, or three terms to approximate the error function, additional terms can be used to obtain additional precision.

Although the specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. It is to be understood that the above description is intended to be illustrative, and not restrictive. Combinations of the above embodiments and other embodiments will be apparent to those of skill in the art upon reviewing the above description. The scope of the invention includes any other applications in which the above structures and fabrication methods are used. Accordingly, the scope of the invention should only be determined with reference to the appended claims, along with the full scope of equivalents to which such claims are entitled.

We claim:

1. A system to detect a position of an actuator, comprising:
   a magnetic source coupled to the actuator radiating a field;
   least two sensors to generate a response based on angles of the field; and
   an analyzer receptive to the response to produce an enhanced position of the magnetic source to compensate for an error caused by a misalignment of the at least two sensors.

2. The system of claim 1, wherein the misalignment is selected from a group consisting of a horizontal misalignment, a vertical misalignment, and a rotational misalignment.

3. The system of claim 1, wherein the magnetic source is coupled to the actuator such that the at least two sensors are opposingly positioned with respect to the magnetic source.

4. The system of claim 1, wherein the at least two sensors includes eight sensors.

5. The system of claim 1, wherein the enhanced position is a sum of a quantity and three adjustments, wherein each of the three adjustments is sinusoidal.

6. The system of claim 1, further comprising:
   a valve, wherein the actuator is to move longitudinally to control the valve.

7. The system of claim 1, wherein the magnetic source moves to a new position when the actuator moves to the new position.

8. The system of claim 1, wherein the misalignment comprises a skew misalignment.

9. The system of claim 1, wherein the misalignment comprises a run-out misalignment.

10. The system of claim 1, wherein the response comprises data points.

11. A system comprising:

a moveable actuator;

a magnet coupled to the moveable actuator, wherein the magnet radiates a field;

a plurality of sensors to generate a response based on incident angles of the field; and an analyzer receptive to the response to produce an enhanced position of the magnet to compensate for an error caused by a misalignment of at least one of the plurality of sensors.

12. The system of claim 11, wherein the response comprises a plurality of data points.

13. The system of claim 11, wherein the misalignment comprises a run-out misalignment.

14. The system of claim 13, wherein the run-out misalignment comprises a non-equidistant gap between the magnet and the plurality of sensors as the actuator moves.

15. The system of claim 11, wherein the misalignment comprises a skew misalignment.

16. The system of claim 11, wherein the misalignment comprises a horizontal misalignment.

17. The system of claim 11, wherein the misalignment comprises a vertical misalignment.

18. The system of claim 11, wherein the misalignment comprises a rotational misalignment.

19. The system of claim 11, wherein the misalignment comprises a horizontal and a vertical misalignment.

20. The system of claim 11, wherein the misalignment is introduced during manufacturing of the at least one of the plurality of sensors.

* * * * *